United States Patent
Doshi et al.

(10) Patent No.: US 11,606,417 B2
(45) Date of Patent: Mar. 14, 2023

(54) TECHNOLOGIES FOR MATCHING SECURITY REQUIREMENTS OF FUNCTION-AS-A-SERVICE IN EDGE CLOUDS

(71) Applicant: IntelCorporation, Santa Clara, CA (US)

(72) Inventors: Kshitij Doshi, Tempe, AZ (US); Francesc Guim Bernat, Barcelona (ES); Suraj Prabhakaran, Aachen (DE); Ned M. Smith, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/170,627

(22) Filed: Feb. 8, 2021

(65) Prior Publication Data

US 2021/0297477 A1    Sep. 23, 2021

Related U.S. Application Data

(63) Continuation of application No. 16/369,413, filed on Mar. 29, 2019, now Pat. No. 10,917,461.

(51) Int. Cl.
*H04L 67/1004* (2022.01)
*H04L 9/40* (2022.01)
*H04L 41/5041* (2022.01)

(52) U.S. Cl.
CPC .......... *H04L 67/1004* (2013.01); *H04L 63/08* (2013.01); *H04L 41/5041* (2013.01)

(58) Field of Classification Search
None
See application file for complete search history.

(56) References Cited

U.S. PATENT DOCUMENTS

| | | | |
|---|---|---|---|
| 6,981,029 B1 | 12/2005 | Menditto et al. | |
| 7,133,894 B2 * | 11/2006 | Banerjee | G06F 8/71 709/219 |
| 9,038,145 B2 * | 5/2015 | Brown | G06F 21/10 713/160 |
| 10,917,461 B2 | 2/2021 | Doshi et al. | |

(Continued)

OTHER PUBLICATIONS

United States Patent and Trademark Office, "Non-Final Office Action," issued in connection with U.S. Appl. No. 16/369,413, dated Apr. 16, 2020, 13 pages.

(Continued)

*Primary Examiner* — Joshua Joo
(74) *Attorney, Agent, or Firm* — Hanley, Flight & Zimmerman, LLC (57) ABSTRACT

Technologies for matching security requirements for a function-as-a-service (FaaS) function request to an edge resource having security features matching the security requirements are disclosed. According to one embodiment of the present disclosure, an edge gateway device receives, from an edge device, a request to execute an accelerated function. The edge gateway device selects, as a function of one or more security requirements requested by the edge device, an edge resource to fulfill the request. The edge gateway device transmits the request to the edge resource to fulfill the request of the edge device, according to the one or more security requirements.

13 Claims, 5 Drawing Sheets

(56) References Cited

U.S. PATENT DOCUMENTS

| | | |
|---|---|---|
| 2006/0155633 A1 | 7/2006 | Fellenstein et al. |
| 2015/0089057 A1 | 3/2015 | Ravindran et al. |
| 2015/0180736 A1* | 6/2015 | Leung ................. H04L 41/5054 |
| | | 709/226 |
| 2016/0105430 A1 | 4/2016 | Smith |
| 2018/0139274 A1 | 5/2018 | Gandhi et al. |
| 2018/0173477 A1 | 6/2018 | Porwal et al. |
| 2019/0042315 A1* | 2/2019 | Smith ................... G06F 9/5077 |
| 2019/0065323 A1* | 2/2019 | Dhamdhere ........ G06F 11/1484 |
| 2019/0179684 A1 | 6/2019 | On et al. |
| 2019/0281123 A1* | 9/2019 | Luo ..................... G06F 9/45558 |
| 2019/0349447 A1* | 11/2019 | Adams ................. G06F 9/5027 |
| 2020/0057676 A1 | 2/2020 | Vaikar |

OTHER PUBLICATIONS

United States Patent and Trademark Office, "Notice of Allowance and Fee(s) Due," issued in connection with U.S. Appl. No. 16/369,413, dated Oct. 7, 2020, 7 pages.

\* cited by examiner

TECHNOLOGIES FOR MATCHING SECURITY REQUIREMENTS OF FUNCTION-AS-A-SERVICE IN EDGE CLOUDS

BACKGROUND

Edge computing provides processing resources at a location in closer network proximity to a requesting device, as opposed to a centralized location in a cloud network. Doing so ensures that devices receive critical data relatively quickly. Further, service providers within an edge network may provide services accessible by edge devices for various applications. For example, a service provider may implement Function-as-a-Service (FaaS) services that an edge device may request. In particular, an edge device may send a request, to a FaaS service, to execute an accelerated function on accelerator devices hosted by the service provider. Doing so allows the edge device to carry out workload operations relatively faster than if the operations were performed on a traditional processor. Further, because the accelerated functions are carried out over the edge network, the edge device can receive the result of the accelerated function at a relatively low latency.

Multiple service providers may host a given accelerated function. However, each service provider may assign security features that differ from features provided by other service providers. For example, a service provider A may provide encryption algorithms of a given type and up to a specified bit size specification, whereas a service provider B provides encryption algorithms of a different type and of a different bit size specification. As another example, the service provider A may be certified as a trusted provider by certain organizations, whereas the service provider B might not have the same certification. Given the many use cases for edge devices (e.g., augmented and virtual reality, assisted and autonomous driving, factory automation, proximity triggered services, and so on), the variety of workloads of each use case may require security features that differ from one another.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

Figure 1:
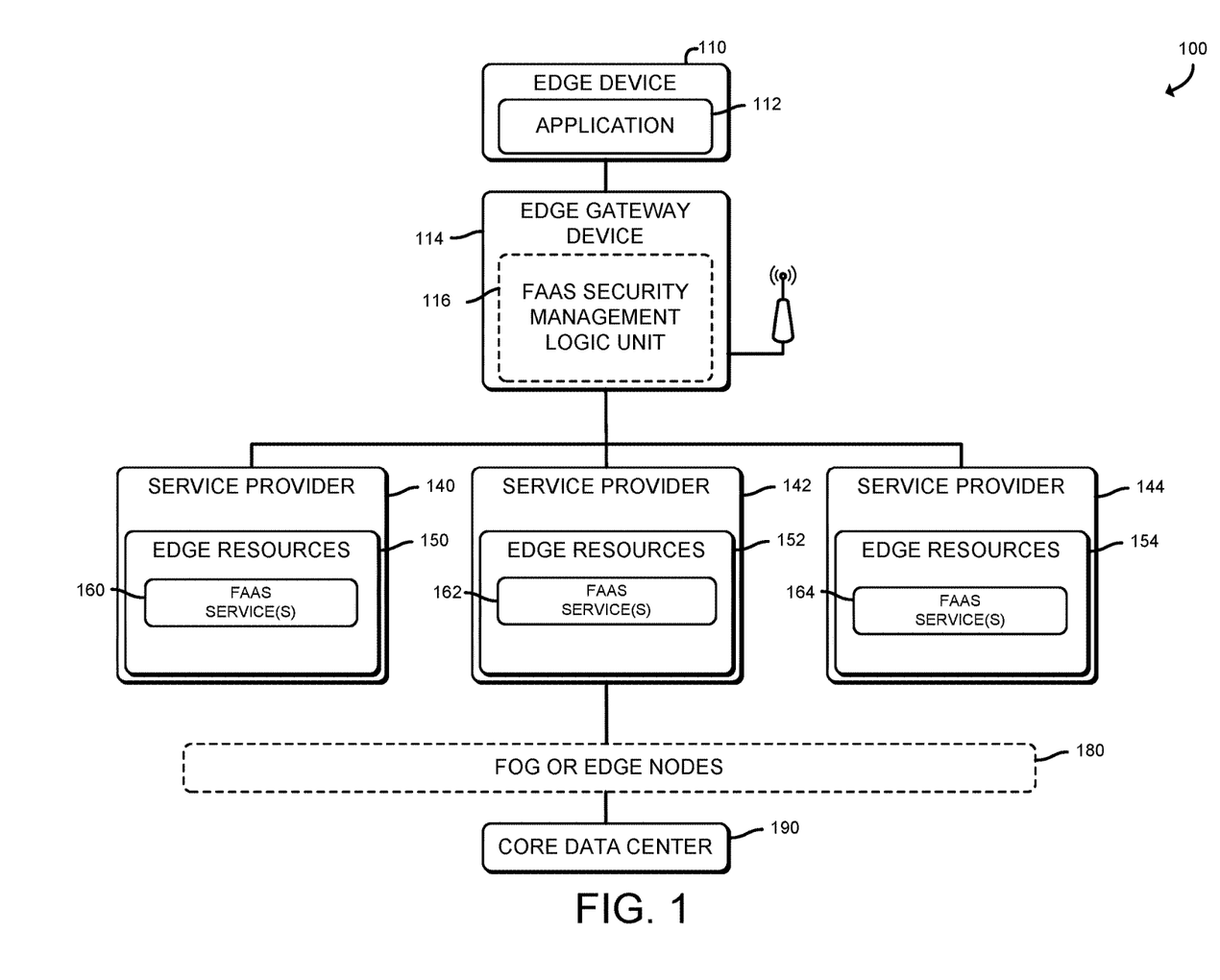
FIG. 1 is a simplified diagram of at least one embodiment of a system for matching security requirements for requested accelerated functions to a Function-as-a-Service provider.

Referring now to FIG. 1, a system 100 for matching security requirements for a requested accelerated function to a Function-as-a-Service (FaaS) provider includes an edge device 110 in communication with an edge gateway device 114. The edge gateway device 114 may be embodied as any computing device capable of communicating data between the edge device 110 and one or more edge resources 150, 152, 154 (e.g., resources, such as compute devices and the components thereof, owned and/or operated by one or more service providers 140, 142, 144, respectively, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices forming the edge resources 150, 152, 154), latencies, power usage, and costs (e.g., monetary costs) associated with utilizing those edge resources 150, 152, 154. The edge gateway device 114 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a relative network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service operated by one of the service providers 140, 142, 144 (or to the fog or edge nodes 180 or core data center 190). Other edge device 110 and application 112 use cases may include IoT devices in smart cities, augmented reality (AR)/virtual reality (VR), assisted driving vehicles, factory automation, proximity triggered services, and so on.

Further, an edge device 110 may send requests to FaaS services 160 162, 164 included as part of the edge resources 150, 152, 154. Each FaaS service 160, 162, 164 allows the application 112 to access accelerated functions hosted by the service providers 140, 142, 144. An accelerated function may be embodied as predefined bit stream data to be executed on an accelerator device provided by the edge resources 150, 152, 154, such as a field programmable gate array (FPGA), application specific integrated circuit (ASIC), graphics processing unit (GPU) etc.). Advantageously, an application 112 may request accelerated functions to accelerate execution of workload operations (e.g., AR/VR functions, machine learning functions, matrix operations, and so on).

Further still, each service provider 140, 142, 144 may define one or more security features for each FaaS service 160, 162, 164, respectively. In addition, the security features may differ across each FaaS service 160, 162, and 164. For example, the FaaS service 160 may apply only 128-bit Advanced Encryption Standard (AES) encryption to data input to a given accelerated function, while the FaaS service 162 allows for 128-, 192-, and 256-bit AES encryption. As another example, the FaaS service 160 may be certified as a trusted provider by a certificate authority A, while the FaaS service 164 is certified as a trusted provider by a certificate authority B. Other examples of features that can differ across service providers 140, 142, 144 include version of the accelerated function, types of security algorithms used to secure data passed to the accelerated function, date of latest updates to a given accelerated function, and the like.

Typically, the application 112 requires a certain level of security requirements based on use case and based on a desired accelerated function. One approach for specifying such requirements includes transmitting a request to the edge network with a static list of requirements to the core data center 190 for each accelerated function, and in turn, the core data center mapping the requests to a given service provider 140, 142, 144 accordingly. However, in doing so, the core data center 190 may need to update the mappings in response to changes in requirements by the application 112, resulting in considerable overhead on both the client- and data center-level and resource fragmentation. Another approach includes the core data center 190 performing a handshake operation with the application 112 to receive an acknowledgement before selecting the appropriate FaaS service to fulfill a given request. However, doing so can impede time-critical FaaS requests from being completed within quality-of-service deadlines and may require proactive reservation and fragmentation of resources.

As further described herein, embodiments provide techniques for dynamically assigning requests to FaaS services based on matching security requirements. In an embodiment, the illustrative edge gateway device 114 includes a FaaS security management logic unit 116. The FaaS security management logic unit 116 may be embodied as any device and/or circuitry (e.g., a co-processor, FPGA, ASIC, etc.) configured to provide an interface between an edge device 110 and FaaS services 160, 162, 164 that may have heterogeneous security features. The interface provided by the FaaS security management logic unit 116 may be used in assigning requests to a given FaaS service 160, 162, and 164 based on available security features and other policies (e.g., a load balancing policy, QoS requirements, SLA requirements, and the like). More particularly, the interface enables an application 112 to send, to the edge gateway device 114 along with a FaaS service request to execute an accelerated function, preprocessing code (e.g., an executable file, binary, bit stream data executable by an acceleration device on the edge gateway device 114) associated with that accelerated function. In an embodiment, the preprocessing code invokes application programming interfaces (APIs) exposed by the edge gateway device 114 to access a configurable list of service providers 140, 142, 144. The list specifies security features associated with the accelerated function at each service provider 140, 142, 144. When executed, the edge gateway device 114 receives a matching of the security requirements to one or more edge resources 150, 152, 154—more particularly, the FaaS services 160, 162, 164). Once matched, the edge gateway device 114 may map the FaaS request to one of the matching FaaS services 160, 162, 164 (e.g., the mapping being further determined on other criteria, such as a load balancing policy and QoS requirements).

Advantageously, such an approach provides greater flexibility on a client-side edge device 110. For instance, this approach does not add considerable management overhead to the client or even devices configured for orchestration in the system 100. Further, the edge device 100 may ensure any checks to perform on service providers and security are performed with granularity by the preprocessing code. For example, FaaS services may be regularly updated with one or more additional features. In turn, such updates may possibly add or compromise security features. This approach ensures that an edge device 110 may provide preprocessing code to perform checks on such updated versions. Further, because this approach seamlessly allows the edge device 110 to specify different security requirements for different instances of FaaS requests, the edge gateway device 110 may diversify allocation of edge resources 150, 152, 154 and service FaaS requests relatively more efficiently.

Figure 2:
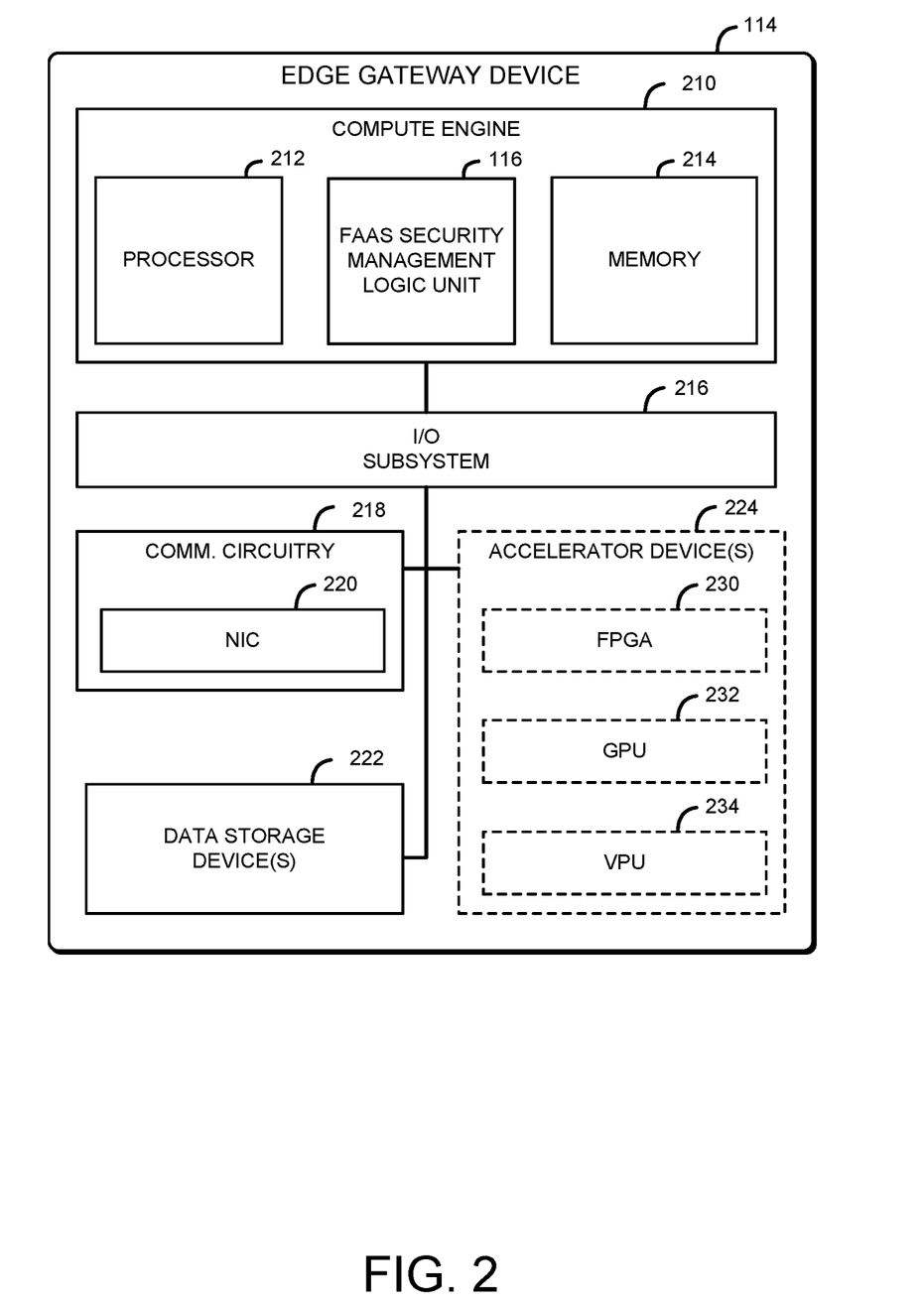
FIG. 2 is a simplified block diagram of at least one embodiment of an edge gateway device included in the system described relative to FIG. 1.

Referring now to FIG. 2, the edge gateway device 114 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). Illustratively, the edge gateway device 114 includes a compute engine (also referred to herein as "compute engine circuitry") 212, an input/output (I/O) subsystem 216, communication circuitry 218, and one or more data storage devices 222. As described herein, the edge gateway device 114 may also include one or more accelerator devices 224. Of course, in other embodiments, the edge gateway device 114 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. Further, the compute engine 210 includes the FaaS security management unit 116, described above with reference to FIG. 1. The processor 212 may be embodied as any type of processor capable of performing the functions described herein (e.g., processing service requests to edge resources of an edge device 110). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, other specialized hardware to facilitate performance of the functions described herein, or a virtualized version thereof.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The compute engine 210 is communicatively coupled to other components of the edge gateway device 114 via the I/O subsystem 216, which may be embodied as circuitry and/or components to facilitate input/output operations with the compute engine 210 (e.g., with the processor 212 and/or the memory 214) and other components of the edge gateway device 114. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the memory 214, and other components of the edge gateway device 114, into the compute engine 210.

The communication circuitry 218 may be embodied as any communication circuit, device, or collection thereof, capable of enabling communications over a network between the edge gateway device 114 and another compute device (e.g., the edge device 110, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (MC) 220, which may also be referred to as a host fabric interface (HFI). The MC 220 may be embodied as one or more add-in-boards, daughter cards, network interface cards, controller chips, chipsets, or other devices that may be used by the edge gateway device 114 to connect with another compute device (e.g., the edge device 110, the edge resources 150, 152, 154, etc.). In some embodiments, the MC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway device 114 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations faster than the processor 212 is capable of executing the operations, such as machine learning or artificial intelligence operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). Particularly, a given accelerator device 224 may include one or more slots, each of which may be programmed with a kernel bit stream indicative of a function (e.g., a function-as-a-service (FaaS) function or an accelerated function as a service (AFaaS) function). In response to a service request, the accelerator device may execute a given bit stream to accelerate execution of the function. The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., the compute devices 160, 162, 164, 166, 168, 170), the edge device 110, the fog nodes 180, and the core data center 190 may have components similar to those described in FIG. 2 with reference to the edge gateway device 114. The description of those components of the edge gateway device 114 is equally applicable to the description of components of the edge resources 150, 152, 154 (e.g., the devices executing FaaS services 160, 162, 164, 166, 168, 170), the edge device 110, the fog nodes 180, and the core data center 190, with the exception that, in some embodiments, the FaaS security management logic unit 116 is not included in devices other than the edge gateway device 114. Further, it should be appreciated that any of the edge resources 150, 152, 154 (e.g., the devices executing FaaS services 160, 162, 164, 166, 168, 170), the edge device 110, the fog nodes 180, and the core data center 190 may include other components, sub-components, and devices commonly found in a computing device, which are not discussed above in reference to the edge gateway device 114 and not discussed herein for clarity of the description. Further, it should be understood that one or more components of a compute device may be distributed across any distance, and are not necessarily housed in the same physical unit.

The edge gateway device 114, edge resources 150, 152, 154 (e.g., the devices executing FaaS services 160, 162, 164, 166, 168, 170), the edge device 110, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
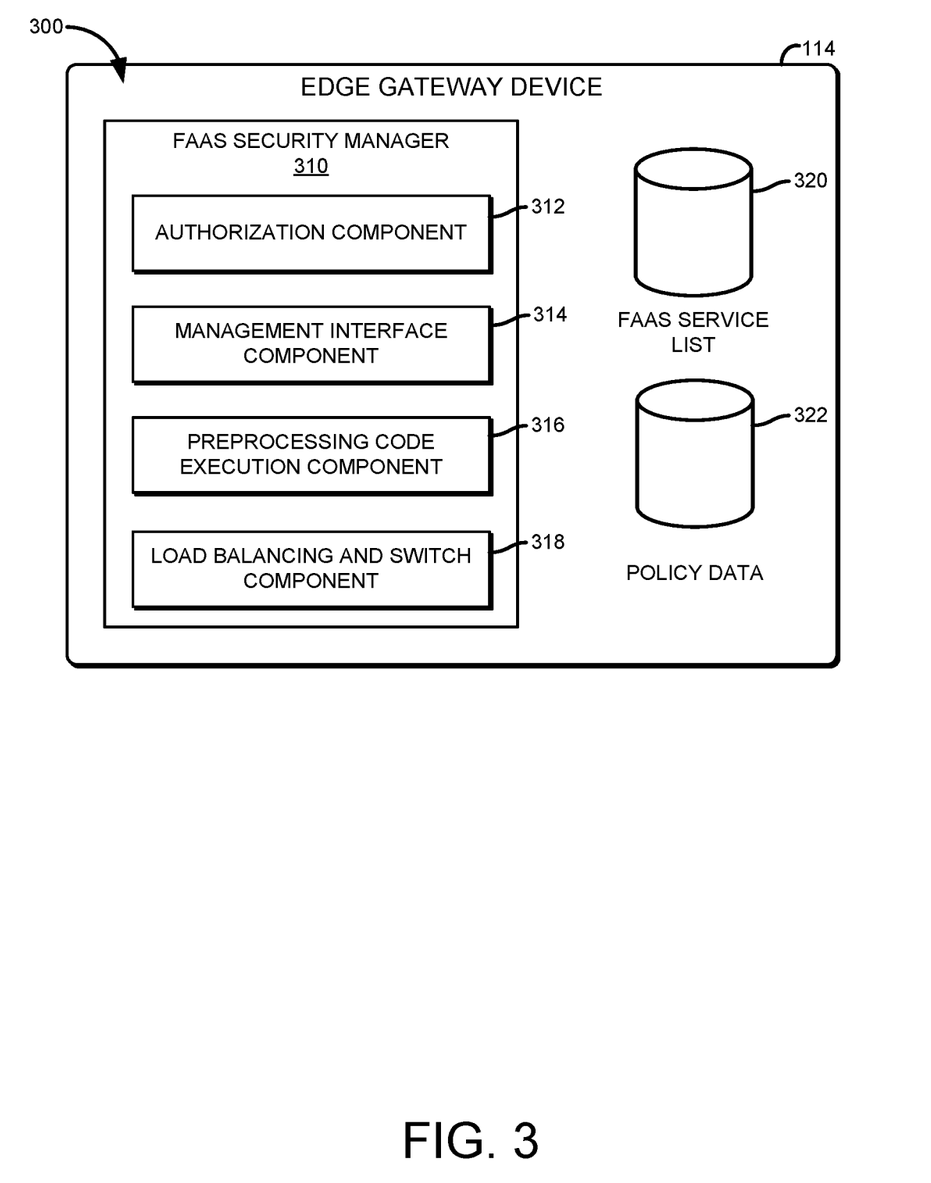
FIG. 3 is a simplified block diagram of an environment that may be established by the edge gateway device of FIGS. 1 and 2.

Referring now to FIG. 3, the edge gateway device 114 may establish an environment 300 during operation. The illustrative environment 300 includes a FaaS security manager 310, a FaaS service list 320, and security and policy data 322. The FaaS security manager 310 is configured to perform the functions described herein, such as receiving a FaaS request from an edge device 110, executing preprocessing code to identify one or more FaaS services that match security requirements specified in the FaaS request, transmitting the FaaS request to an identified FaaS service, and returning the result to the requesting edge device 110.

As shown, the FaaS security manager 310 includes an authorization component 312, a management interface component 314, a preprocessing code execution component 316, and a load balancing and switch component 318. Each of the components of the environment 300 may be embodied as hardware, firmware, software, or a combination thereof. In some embodiments, one or more of the components of the environment 300 may be embodied as circuitry or a collection of electrical devices (e.g., FaaS security manager circuitry 310, authorization component circuitry 312, management interface component circuitry 314, preprocessing code execution component circuitry 316, load balancing and switch component circuitry 318, etc.). It should be appreciated that, in such embodiments, one or more of the FaaS security manager circuitry 310, authorization component circuitry 312, management interface component circuitry 314, preprocessing code execution component circuitry 316, or load balancing and switch component circuitry 318 may form a portion of the FaaS security management logic unit 116 (or other components of the edge gateway device 114).

In the illustrative embodiment, the FaaS service list 320 may be embodied as any data indicative of currently available FaaS services provided by each service provider in the system 100, e.g., service providers 140, 142, and 144. In addition to the FaaS services, the list also specifies security features associated with each listed FaaS service (e.g., FaaS version, security algorithms used, bit sizes used in each security algorithm used, date associated with the FaaS version, certifications, and the like). The FaaS service list 320 may be embodied as a relational database, CSV file, mark-up language file (e.g., a JavaScript Object Notation file, eXtensible Markup Language file, and the like). The policy data 322 may be embodied as any data indicative of load balancing and switching policies associated with routing FaaS requests to a particular FaaS service. For example, the policy data 322 may specify a particular load balancing technique to use for incoming FaaS requests once one or more FaaS services are identified to match a given set of security requirements for a requested accelerated function. In addition, the policy data 322 may be embodied as any data indicative of QoS requirements (e.g., for latency, throughput, and the like) applied to servicing of a given FaaS request.

The illustrative authorization component 312 is configured to process incoming requests by an edge device 110. The authorization component 312 may evaluate the request for credentials supplied thereto (e.g., a device ID, login credentials, attestation credentials) to authenticate the request. Further, the authorization component 312, on receiving a request, may temporarily store in a queue initialized by a user request logic. The queue stores requests prior to the load balancing and switch component 318 dispatching the request to a selected FaaS service.

The management interface component 314 is configured to update the FaaS service list 320 with currently available FaaS services and corresponding security features. Service providers 140, 142, 144 may communicate the updates to the edge gateway device 114 via APIs provided by the management interface component 314.

The preprocessing code execution component 316 is configured to execute preprocessing code received along with the request. For example, the authorization component 312, after authenticating the request and the requesting edge device 110, may send the preprocessing code execution component 316 preprocessing code sent by the edge device 110 along with the request. For example, the preprocessing code execution component 316 may program an accelerated device on the edge gateway device 114 to execute the preprocessing code (e.g., in the event that the preprocessing code is embodied as a FPGA bit stream).

The load balancing and switch component 318 is configured to distribute FaaS requests to identified FaaS services hosted by one or more service providers. For example, to do so, the load balancing and switch component 318, may retrieve requests from the aforementioned user request logic queue. The retrieved requests are associated with preprocessing code that has already been executed and a matching one or more FaaS services have been identified. The load balancing and switch component 318 may match the request to an appropriate FaaS service providing unit according to the policy data 322. Once the FaaS execution of an accelerated function by the service is complete, the load balancing and switch component 318 may direct the result of accelerated function to the edge device 110. In other cases, the load balancing and switch component 318 may store the result in a queue at a repository for retrieval by the edge device 110.

Figure 4:
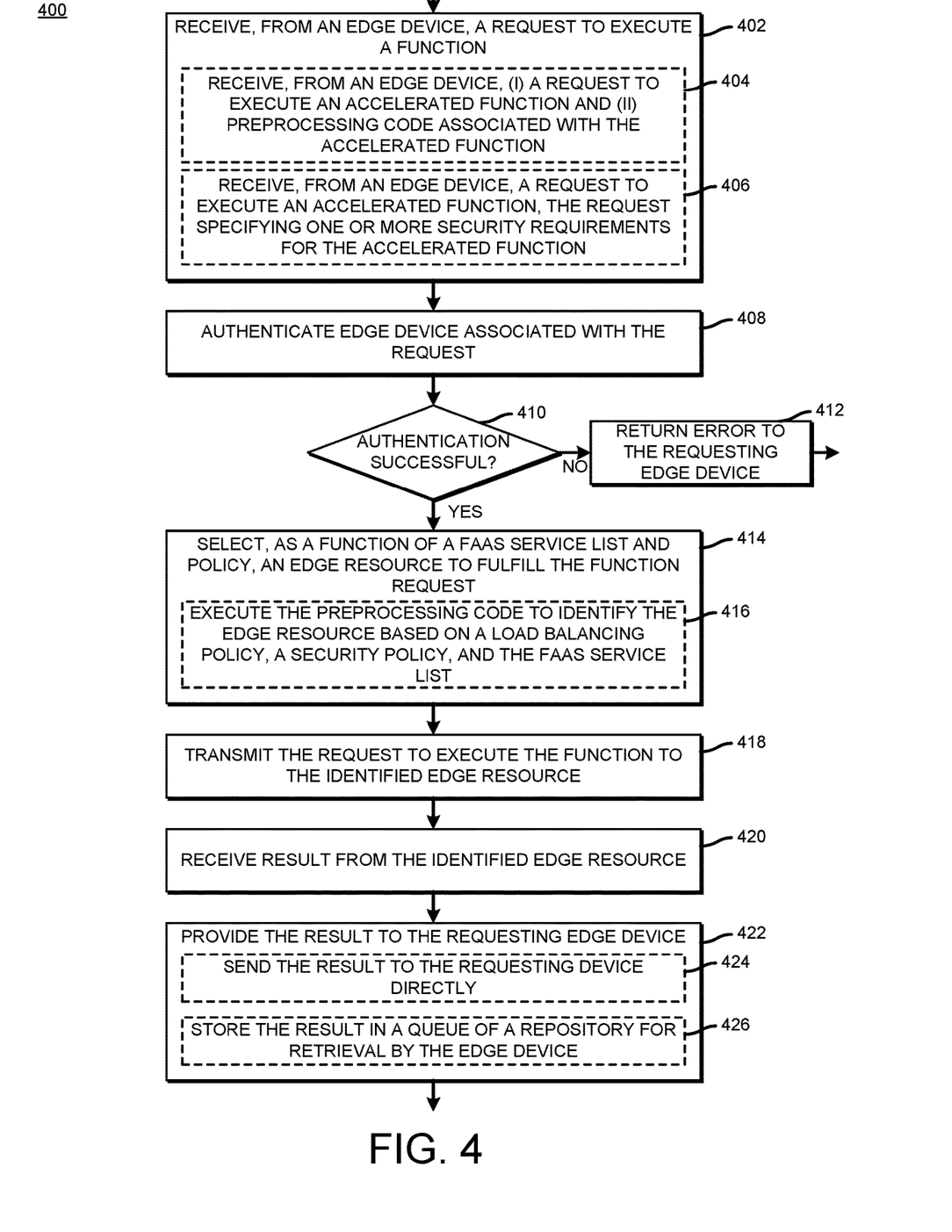
FIG. 4 is a simplified block diagram of at least one embodiment of a method that may be performed by the edge gateway device of FIGS. 1 and 2 for matching security requirements for requested accelerated functions to a Function-as-a-Service service provider.

Referring now to FIG. 4, the edge gateway device 114, in operation, may execute a method 400 for matching security requirements for requested accelerated functions to a FaaS service provider. In an embodiment, the method 400 may be carried out by various hardware and/or software components of the edge gateway device 114, such as those components described relative to the FaaS security manager 310. In another embodiment, the method 400 may be carried out by virtualized hardware components.

As shown, the method 400 begins in block 402, in which the edge gateway device 114 receives, from an edge device 110, a request to execute a function by one of multiple service providers that host the accelerated function. For example, in block 404, the edge gateway device 114 may receive, from the edge device 110, a request to execute an accelerated function and also preprocessing code associated with the accelerated function. As another example, in block 406, the edge gateway device 114 may receive, from the edge device 110, a request to execute an accelerated function, the request specifying one or more security requirements for executing the accelerated function. For example, preprocessing code may be included to query a FaaS service list for a latest version of a given accelerated function from a service provider certified by a given certificate authority.

In block 408, the edge gateway device 114 authenticates the edge device associated with the request. For example, the edge gateway device 114 may evaluate credentials provided in the request for authenticating the edge device 114 and the request. Such credentials may include a device identifier, a user and password combination, public key data, and the like. In block 410, the edge gateway device 114 determines whether the authentication is successful. If not, then in block 412, the edge gateway device 114 returns an error to the requesting edge device 110.

Otherwise, in block 414, the edge gateway device 114 selects, as a function of a FaaS service list and one or more policies, an edge resource to fulfill the function request. More particularly, to do so, in block 416, the edge gateway device 114 executes the preprocessing code to identify the edge resource based on a load balancing policy, a security policy, and the FaaS service list. Execution of the preprocessing code may cause the edge gateway device 114 to evaluate the edge service providers or a list of FaaS services for security features matching security requirement criteria specified in the request.

In block 418, the edge gateway device 114 transmits the request to execute the function to the identified edge resource hosted by the service provider. In the event that more than one edge resource is identified, the edge gateway device 114 may apply one or more policies, such as load balancing policies and QoS requirement, to determine which of the identified edge resources should service the request.

In turn, the identified edge resource (more particularly, the identified FaaS service having security features matching requested security requirements) executes the accelerated function on behalf of the edge device 110. The FaaS service may return the result to the edge gateway device 114. In block 420, the edge gateway device 114 receives the result from the identified edge resource. In block 422, the edge gateway device 114 provides the request to the requesting edge device 110. For example, to do so, in block 424, the edge gateway device 114 sends the result to the requesting device directly. As another example, in block 426, the edge gateway device 114 stores the result in a queue of a repository for retrieval by the edge device 110.

Figure 5:
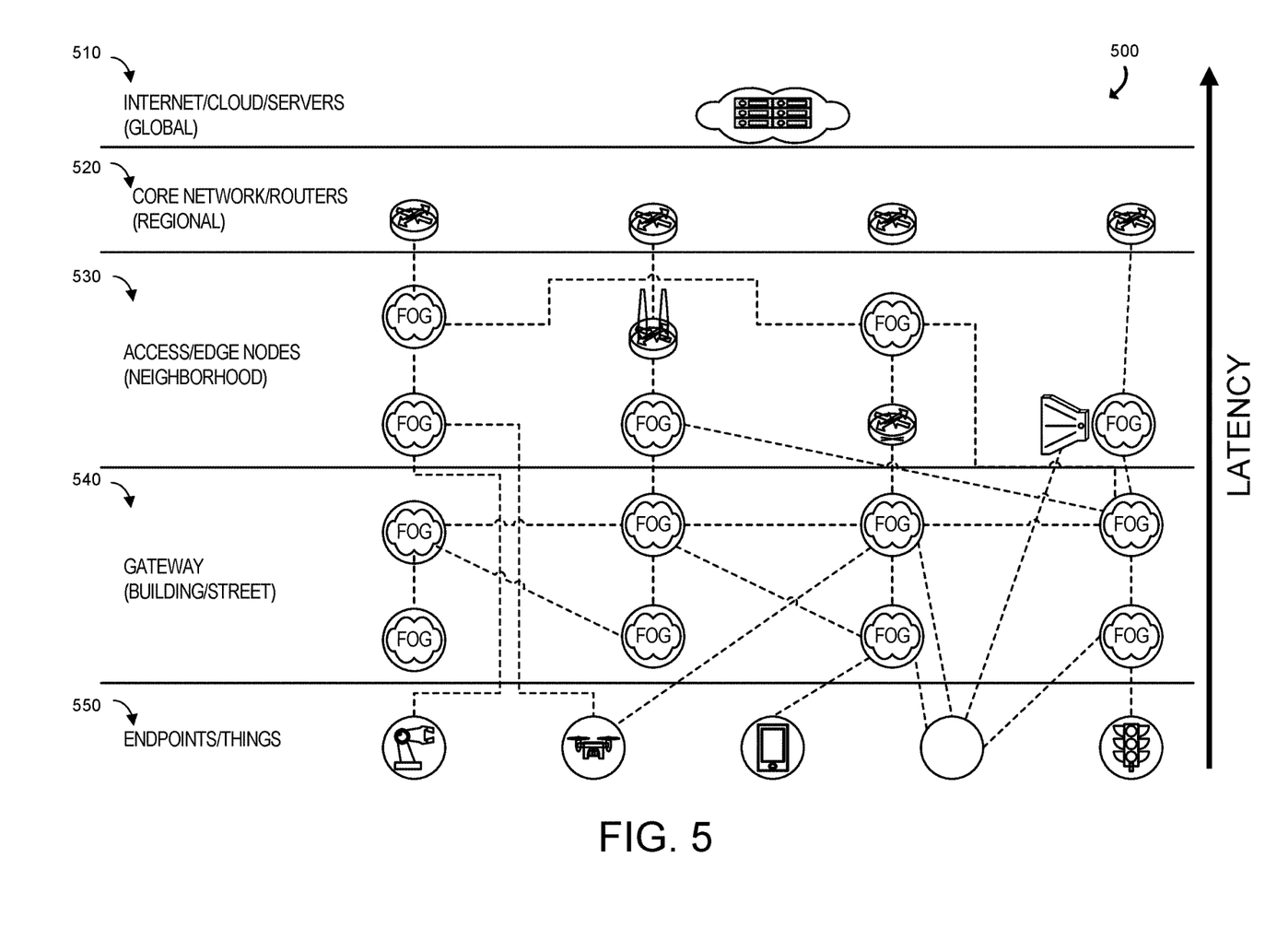
FIG. 5 is a simplified block diagram of a fog and mobile edge computing (MEC) network topology that may be utilized with the system of FIG. 1.

Referring briefly to FIG. 5, a MEC and fog network topology 500 is shown. The network topology 500 includes endpoints (at an endpoints/things network layer 550), gateways (at a gateway layer 540), access or edge computing nodes (e.g., at neighborhood nodes layer 530), core network or routers (e.g., at a regional or central office layer 520). A fog network (e.g., established at the gateway layer 540) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE of 5G core network), among others. In this context, FIG. 5 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device comprising circuitry to receive, from an edge device, a request to execute a function; select, as a function of one or more security requirements requested by the edge device, one of a plurality of edge resources to fulfill the request; and transmit the request to the edge resource to fulfill the request of the edge device according to the one or more security requirements.

Example 2 includes the subject matter of Example 1, and wherein the circuitry is further to receive, from the edge device, preprocessing code associated with the function.

Example 3 includes the subject matter of any of Examples 1 and 2, and wherein to select the one of the plurality of edge resources to fulfill the request comprises to execute the preprocessing code, wherein execution of the preprocessing code causes the device to identify one of the plurality of edge resources having security features satisfying the one or more security requirements specified in the request.

Example 4 includes the subject matter of any of Examples 1-3, and wherein the execution of the preprocessing code causes the device to further identify the one of the plurality of edge resources based on a load balancing policy.

Example 5 includes the subject matter of any of Examples 1-4, and wherein the circuitry is further to receive, from the edge resource, a result of an execution of the function.

Example 6 includes the subject matter of any of Examples 1-5, and wherein the circuitry is further to provide the result to the requesting edge device.

Example 7 includes the subject matter of any of Examples 1-6, and wherein to provide the result to the requesting edge device comprises to transmit, over a network connection, the result to the requesting edge device.

Example 8 includes the subject matter of any of Examples 1-7, and wherein to provide the result to the requesting edge device comprises to store the result in a queue of a repository for retrieval by the edge device.

Example 9 includes the subject matter of any of Examples 1-8, and wherein the circuitry is further to authenticate the edge device associated with the request.

Example 10 includes the subject matter of any of Examples 1-9, and wherein the circuitry is further to, upon a failure to authenticate the edge device associated with the request, return an error to the edge device.

Example 11 includes a method comprising receiving, by an edge gateway device and from an edge device, a request to execute a function; selecting, by the edge gateway device and as a function of one or more security requirements requested by the edge device, one of a plurality of edge resources to fulfill the request; and transmitting, by the edge gateway device, the request to the edge resource to fulfill the request of the edge device according to the one or more security requirements.

Example 12 includes the subject matter of Example 11, and further including receiving, from the edge device and by the edge gateway device, preprocessing code associated with the function.

Example 13 includes the subject matter of any of Examples 11 and 12, and wherein selecting, by the edge gateway device, the one of the plurality of edge resources to fulfill the request comprises executing, by the edge gateway device, the preprocessing code, wherein executing the preprocessing code causes the edge gateway device to identify one of the plurality of edge resources having security features satisfying the one or more security requirements specified in the request.

Example 14 includes the subject matter of any of Examples 11-13, and wherein executing, by the edge gateway device, of the preprocessing code causes the edge gateway device to further identify the one of the plurality of edge resources based on a load balancing policy.

Example 15 includes the subject matter of any of Examples 11-14, and further including receiving, from the edge resource and by the edge gateway device, a result of an execution of the function.

Example 16 includes the subject matter of any of Examples 11-15, and further including providing, by the edge gateway device, the result to the requesting edge device.

Example 17 includes the subject matter of any of Examples 11-16, and wherein providing, by the edge gateway device, the result to the requesting edge device comprises transmitting, over a network connection and by the edge gateway device, the result to the requesting edge device.

Example 18 includes the subject matter of any of Examples 11-17, and wherein providing, by the edge gateway device, the result to the requesting edge device comprises storing, by the edge gateway device, the result in a queue of a repository for retrieval by the edge device.

Example 19 includes the subject matter of any of Examples 11-18, and further including authenticating, by the edge gateway device, the edge device associated with the request; and upon a failure to authenticate the edge device associated with the request, returning, by the edge gateway device, an error to the edge device.

Example 20 includes one or more machine-readable storage media comprising a plurality of instructions stored thereon that, in response to being executed, causes a device to receive, from an edge device, a request to execute a function; select, as a function of one or more security requirements requested by the edge device, one of a plurality of edge resources to fulfill the request; and transmit the request to the edge resource to fulfill the request of the edge device according to the one or more security requirements.

What is claimed is:

1. A non-transitory computer readable medium comprising instructions that, when executed, cause a machine to at least:
   parse a function as a service (FaaS) request to identify a security requirement, wherein the FaaS request includes an executable file that includes preprocessing code and the preprocessing code, when executed, invokes an application programming interface (API) exposed by an edge gateway;
   identify an accelerated function for execution;
   store, in a queue, FaaS service providers that perform the accelerated function and meet the security requirement based on instructions associated with the FaaS request;
   distribute the FaaS request to one of the FaaS service providers; and
   in response to receiving a result of the FaaS request, transmit the result of the accelerated function to a sender of the FaaS request.

2. The non-transitory computer readable medium of claim 1, wherein the security requirement includes a requirement that the one of the FaaS service providers supports a security feature.

3. The non-transitory computer readable medium of claim 1, wherein the FaaS request includes the accelerated function.

4. The non-transitory computer readable medium of claim 1, wherein the preprocessing code, when executed, causes an edge gateway to analyze a security feature of an edge gateway after an update is installed at the edge gateway.

5. The non-transitory computer readable medium of claim 1, wherein the preprocessing code is a field programmable gateway array (FPGA) stream to be executed by an accelerated device on an edge gateway device.

6. An apparatus comprising:
   a non-transitory computer readable medium;
   instructions;
   a logic circuit to execute the instructions to at least:
   parse a function as a service (FaaS) request to identify a security requirement wherein the FaaS request includes an executable file that includes preprocessing code, the preprocessing code is at least one of: code that invokes an application programming interface (API) exposed by an edge gateway, code that causes an edge gateway to analyze a security feature of an edge gateway after an update is installed at the edge gateway, or a field programmable gateway array (FPGA) stream to be executed by an accelerated device on an edge gateway device;

identify an accelerated function for execution;

store, in a queue, FaaS service providers that perform the accelerated function and meet the security requirement based on instructions associated with the FaaS request;

distribute the FaaS request to one of the FaaS service providers; and in response to receiving a result of the FaaS request, transmit the result of the accelerated function to a sender of the FaaS request.

7. The apparatus of claim 6, wherein the security requirement includes a requirement that the one of the FaaS service providers supports a security feature.

8. The apparatus of claim 6, wherein the FaaS request includes the accelerated function.

9. A method comprising:

parsing a function as a service (FaaS) request to identify a security requirement, wherein the FaaS request includes an executable file that includes preprocessing code, the preprocessing code is at least one of: code that invokes an application programming interface (API) exposed by an edge gateway, code that causes an edge gateway to analyze a security feature of an edge gateway after an update is installed at the edge gateway, or a field programmable gateway array (FPGA) stream to be executed by an accelerated device on an edge gateway device;

identifying an accelerated function for execution;

storing, in a queue, FaaS service providers that perform the accelerated function and meet the security requirement based on instructions associated with the FaaS request;

distributing the FaaS request to one of the FaaS service providers; and in response to receiving a result of the FaaS request, transmitting the result of the accelerated function to a sender of the FaaS request.

10. The method of claim 9, wherein the security requirement includes a requirement that the one of the FaaS service providers supports a security feature.

11. The method of claim 9, wherein the FaaS request includes the accelerated function.

12. A non-transitory computer readable medium comprising instructions that, when executed, cause a machine to at least:

parse a function as a service (FaaS) request to identify a security requirement, wherein the FaaS request includes an executable file that includes preprocessing code and the preprocessing code, when executed, causes an edge gateway to analyze a security feature of an edge gateway after an update is installed at the edge gateway;

identify an accelerated function for execution;

store, in a queue, FaaS service providers that perform the accelerated function and meet the security requirement based on instructions associated with the FaaS request;

distribute the FaaS request to one of the FaaS service providers; and in response to receiving a result of the FaaS request, transmit the result of the accelerated function to a sender of the FaaS request.

13. A non-transitory computer readable medium comprising instructions that, when executed, cause a machine to at least:

parse a function as a service (FaaS) request to identify a security requirement, wherein the FaaS request includes an executable file that includes preprocessing code and wherein the preprocessing code is a field programmable gateway array (FPGA) stream to be executed by an accelerated device on an edge gateway device;

identify an accelerated function for execution;

store, in a queue, FaaS service providers that perform the accelerated function and meet the security requirement based on instructions associated with the FaaS request;

distribute the FaaS request to one of the FaaS service providers; and in response to receiving a result of the FaaS request, transmit the result of the accelerated function to a sender of the FaaS request.

* * * * *